UNITED STATES PATENT OFFICE.

THILO KROEBER AND CARL JAGERSPACHER, OF BASEL, SWITZERLAND, ASSIGNORS TO THE FIRM OF SOCIETY OF CHEMICAL INDUSTRY IN BASLE, OF BASEL, SWITZERLAND.

AZO DYE AND PROCESS OF MAKING SAME.

No. 12,557. Specification of Reissued Letters Patent. Reissued Nov. 13, 1906.

Original No. 797,441, dated August 15, 1905. Application for reissue filed August 1, 1906. Serial No. 328,820.

*To all whom it may concern:*

Be it known that we, THILO KROEBER, chemist and doctor of philosophy, a subject of the Duke of Saxe-Altenburg, and CARL JAGERSPACHER, chemist and doctor of philosophy, a subject of the Emperor of Austria-Hungary, both residents of Basel, Switzerland, have invented new and useful Improvements in the Manufacture of Monoazo Dyestuffs, of which the following is a specification.

According to published statements (*Berliner Ber.* XXVII, 23) nitrous acid acts on the sulfonic acids of 1:2-amidonaphthol with formation of corresponding quinone acids—that is to say, its action is the same as that of nitric acid—namely, an oxidation. In German patent specification No. 155,083 it is stated that 1:2:4:amidonaphtholsulfonic acid—for example, in the presence of organic acids—may be diazotized and the diazo compound may be combined with resorcinol. As a fact, in this case also the process leads to the formation in considerable proportion of quinone acid as can be gathered from the evolution of red vapors and by the formation of naphthoquinoneanil when a sample of the diazotized liquid is heated with anilin, while there is produced in small proportion with resorcinol a dyestuff soluble in soda-lye to a violet-colored solution. Thus the existence of a normal diazonaphtholsulfonic acid is still very doubtful.

We have made the surprising discovery that by introducing an acid radical into the molecule of the amidonaphtholsulfonic acid the object can be obtained. If, for example, the basic sodium salt of 1:2:4-amidonaphtholsulfonic acid is treated with the calculated proportion or with a slight excess of acetic anhydrid at a reduced or at ordinary temperature acetylization occurs, the acetyl group apparently attacking nearly exclusively the hydroxyl group. If, for instance, the liquid containing the product of the reaction (in case an excess of anhydrid has been used a corresponding excess of alkali is added, so that at the end of the acetylization all may be completely dissolved and the reaction to red litmus may be even feebly alkaline) is mixed with mineral acid and nitrite while cooling with ice until even after lengthy waiting iodin paper still shows a reaction, there is obtained a diazo compound which separates as yellow crystals and may be easily coupled with azo-dyestuff components. From its behavior it appears to be orthoacetoxydiazonaphthionic acid. It combines, for example, with beta-naphthol to form a red dyestuff, which gradually or more quickly, when warmed, passes to a greenish-blue dyestuff in consequence of the elimination of the acetyl group. This elimination occurs also when the said diazo compound is allowed to remain long at rest. Already after the lapse of an hour it is found that a sample treated with an alkaline solution of beta-naphthol does not combine immediately and with a red color, but more gradually with a yellowish-green and, later, a blue color—a behavior which must be ascribed to the diazonaphtholsulfonic acid, which, indeed, is characterized by great stability toward heat. However, as was to be expected, it differs by the more gradual coupling tendency from the corresponding acetyl derivative. The diazonaphtholsulfonic acid is somewhat sparingly soluble in water containing mineral salts, but more easily soluble in pure water. It is easily obtained as beautiful small lustrous laminæ by preparing the aforesaid diazoacetnaphtholsulfonic acid in a somewhat dilute solution, eliminating the acetyl group either by leaving the solution to itself or quite gently warming it and mixing the clear solution with common salt or potassium chlorid. When a stronger solution is being worked, the separation occurs even without common salt.

The manufacture is illustrated by the following example:

23.9 kilos of 1:2-amidonaphtol-4-sulfonic acid are dissolved in two hundred liters of water with aid of twenty-nine kilos of soda-lye of thirty per cent. NaOH and acetylized by means of eleven kilos of acetic anhydrid at a temperature below 0° centigrade while good stirring is maintained. After a short time there are added to the solution, which should have neutral or feebly alkaline reaction, seven kilos of solid sodium nitrite, and the whole is acidified at 0° centigrade by adding all at once thirty kilos of ordinary hydrochloric acid, whereupon the mass immediately solidifies without any evolution of gas to a yellow crystalline magma. This diazo compound is allowed to flow immediately into an aqueous solution of sixteen kilos of 1:6-dioxynaphthalene containing twenty-eight kilos of caustic soda-lye of thirty per cent. strength. At first a violet dyestuff is formed, which already after short stirring passes to a green-blue dyestuff. To isolate it, the liquid is acidified with hydrochloric acid and mixed with common salt. The dyestuff may eventually be purified by redissolving. The dyestuff thus obtained dissolves in water with a violet coloration and in concentrated sulfuric acid with a green-blue coloration. It dyes unmordanted wool in an acid bath deep Bordeaux tints, which pass to deep greenish-black when subsequently treated with chromium compounds.

Instead of eliminating the acetyl group from the dyestuffs the acetyl group may be split off from the diazoacetyloxynaphthalenesulfonic acid before it is combined with dioxynaphthalene.

In the foregoing example the 1:2-amidonaphthol-4-sulfonic acid may be replaced by other sulfo derivates of 1:2-amidonaphthol—as, for instance, 1:2-amidonaphthol-6-sulfonic acid, 1:2-amidonaphthol-4-6-disulfonic acid, 1:2-amidonaphthol-3-6-disulfonic acid, &c. Instead of 1:6-dioxynaphthalene other azo coloring-matter components may be employed. Thus, for instance, beta-naphthol or 1:5-dioxynaphthalene gives a dyestuff which dissolves in water with a violet coloration and in concentrated sulfuric acid with a blue coloration and dyes wool in an acid-bath Bordeaux tints, passing by subsequent treatment with chromium compounds to blue-black. 1:8-dioxynaphthalene gives a dyestuff which dyes wool in an acid-bath blue tints, becoming black by treatment with bichromate.

What we claim is—

1. The process for the manufacture of monoazo dyestuffs, which consists in acidylizing sulfonic acids of 1:2-amidonaphthol in the hydroxyl group, then diazotizing the so-obtained 1-amido-2-acidyl-oxynaphthalenesulfonic acid and combining the resulting diazo compound with an azo coloring-matter component, as described.

2. The process for the manufacture of monoazo dyestuffs, which consists in acetylizing 1:2-amidonaphtholsulfonic acids in the "hydroxyl" group by treating their basic alkali salts in aqueous solution with acetic anhydrid, then diazotizing the so-obtained 1-amido-2-acetoxynaphthalenesulfonic acids and combining the resulting diazo compound with an azo coloring-matter component, substantially as described.

3. An improvement in the manufacture of monoazo dyestuffs, consisting in the process for the manufacture of 1-amido-2-acetoxynaphthalenesulfonic acids, by treating the basic alkali salts of 1:2-amidonaphtholsulfonic acids with acetic anhydrid in an aqueous solution, substantially as described.

4. An improvement in the manufacture of monoazo dyestuffs, consisting in the manufacture of 1-amido-2-acetoxynaphthalene-4-sulfonic acid, by treating the basic sodium salt of 1:2-amidonaphthol-4-sulfonic acid in an aqueous solution with acetic anhydrid.

5. The process for the manufacture of monoazo dyestuffs, which process consists in acetylizing the basic sodium salt of 1:2-amidonaphthol-4-sulfonic acid, diazotizing the so-obtained 1-amido-2-acetoxynaphthalene-4-sulfonic acid, then combining the resulting diazo compound with an azo coloring-matter component, substantially as described.

6. The process for the manufacture of a monoazo dyestuff, which process consists in acetylizing the basic sodium salt of 1:2-amidonaphthol-4-sulfonic acid, diazotizing the so-obtained 1-amido-2-acetoxynaphthalene-4-sulfonic acid, then combining the resulting diazo compound with 1:6-dioxynaphthalene, substantially as described.

7. As new products the monoazo dyestuffs, containing sulfonic acids of 1:2-diazonaphthol, which dyestuffs dissolved in water with violet and in concentrated sulfuric acid with violet to blue colorations and which dye unmordanted wool in Bordeaux to violet tints which tints become on treatment with chromium compounds blue to black.

8. As new products the monoazo dyestuffs containing the 1:2-diazonaphthol-4-sulfonic acid, which dyestuffs dissolved in water with violet and in concentrated sulfuric acid with violet to blue colorations and which dye unmordanted wool in Bordeaux to violet tints which tints become on treatment with chromium compounds blue to black.

9. As a new product the monoazo dyestuff, derived from 1:2-amidonaphthol-4-sulfonic acid and 1:6-dioxynaphthalene which coloring-matter yields a violet aqueous solution, dissolves in concentrated sulfuric acid with greenish-blue coloration and dyes unmordanted wool in Bordeaux shades, which shades become greenish-black on treatment with chromium compounds, substantially as described.

In witness whereof we have hereunto signed our names, this 13th day of July, 1906, in the presence of two subscribing witnesses.

THILO KROEBER.
CARL JAGERSPACHER.

Witnesses:
GEO. GIFFORD,
AMAND RITTER.